(No Model.) 2 Sheets—Sheet 2.
W. H. STICKLE.
FIFTH WHEEL.
No. 295,458. Patented Mar. 18, 1884.
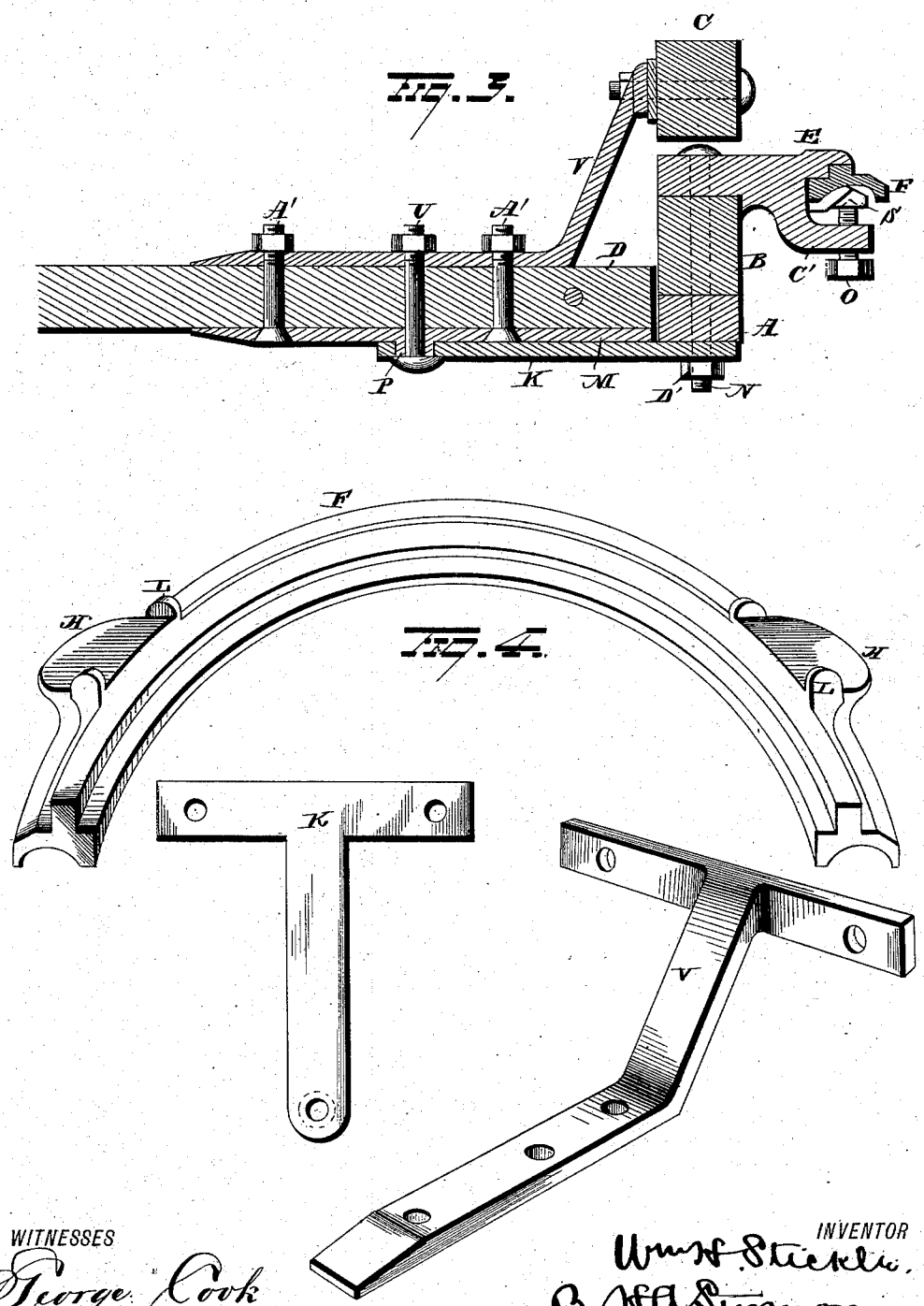
WITNESSES
George Cook
G. F. Downing.
INVENTOR
Wm H. Stickle.
By H. A. Sumnon,
Attorney

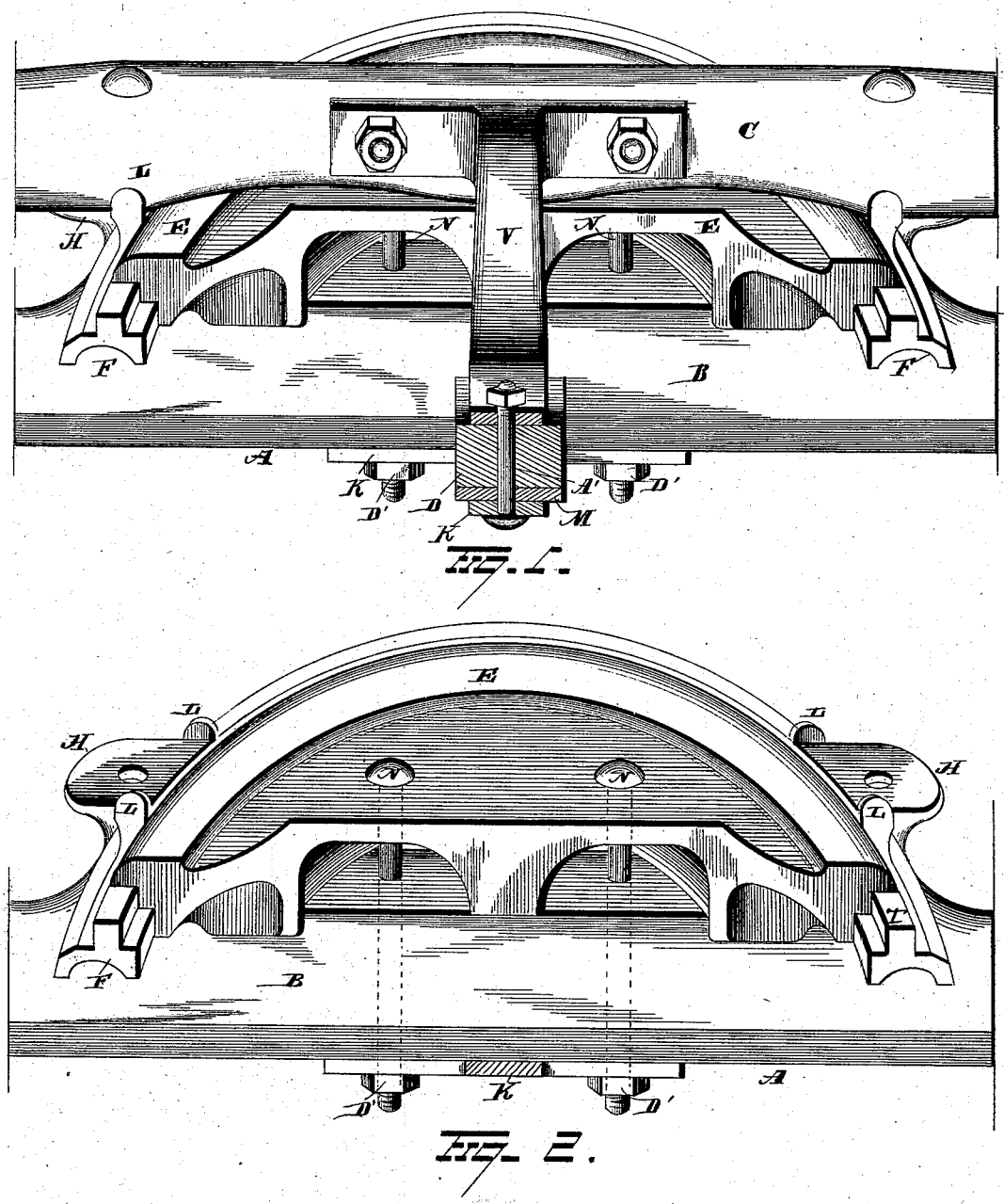

UNITED STATES PATENT OFFICE.

WILLIAM H. STICKLE, OF TERRE HAUTE, INDIANA.

FIFTH-WHEEL.

SPECIFICATION forming part of Letters Patent No. 295,458, dated March 18, 1884.

Application filed July 21, 1883. (No model.)

*To all whom it may concern:*

Be it known that I, WILLIAM H. STICKLE, of Terre Haute, in the county of Vigo and State of Indiana, have invented certain new and useful Improvements in Fifth-Wheels; and I do hereby declare the following to be a full, clear, and exact description of the invention, such as will enable others skilled in the art to which it appertains to make and use the same.

My invention relates to an improvement in fifth-wheels for vehicles, the object being to provide a device of this character which shall dispense with the king-bolt, which is ordinarily adapted to pass through the axle, thereby to a great extent weakening the same.

A further object of my invention is to provide such a wheel that when the axle is cramped said axle will shift from the center, and thus allow the wheels to separate to a greater extent than is permitted by the ordinary construction, thereby rendering less difficult the operation of getting into and out of the vehicle, and avoiding the danger of rubbing against the dirty wheels.

A further object is to provide a wheel by which a shorter turn can be made, and which shall also be simple and economical in construction, and at the same time durable and efficient in use; and with these ends in view my invention consists in certain details of construction and combination of parts, as will be hereinafter explained, and pointed out in the claim.

In the drawings, Figure 1 is a rear view, in perspective, of my improved device. Fig. 2 is a similar view with the bolster removed. Fig. 3 is a sectional view, and Fig. 4 is a detached view of the several parts.

My invention principally consists of two plates, E and F, the plate F being secured to the front bar, C, of the buggy, and the plate E secured to the axle A. These plates are preferably curved, as shown, in the form of an arc, the plate F being provided with the shoulder or track T, the plate E being so formed as to overlap the top and bear against the side of the shoulder, and also to rest on and bear against the inner side of the said plate F. The plate F is provided with the projections H, to which is secured the front bar, C, each of the said projections being provided with the lugs L L, adapted to more securely hold the bar in place. The plate E is preferably secured to the axle A by means of bolts N, passing through the plate E, axle-bed B, axle A, and T-plate K, and are then provided on their ends with the lock-nuts D'. It will now be readily seen that by thus constructing and arranging the plates one within the other the strain is not centered in one point, but is distributed through the two plates, doing away with the king-bolt.

D represents the perch, to which is secured the lower plate, M, provided with the boss or thimble P, which passes through the T-plate K, through which boss passes the bolt U, which pivotally secures the perch D to the axle, the T-plate K being secured to the axle A by the bolts N, as before described. It will be seen that by thus connecting the axle and the perch the axle may be turned independent of the perch. A plate or brace, V, preferably of the form shown, is rigidly secured at one end to the perch D, and at its other end to the front bar, C, which brace is adapted to securely hold the said perch and front bar together and to always retain the same relative position between them, the bolts A' securing the plate to the perch, also securing the plate M thereto. It will now be observed that while the parts are all secured together the axle A is allowed a free rotating movement, said axle, when turned, traveling around with the plate E, and allowing the wheels to be turned within small space, and also allowing a person to step in or out of the carriage without coming in contact with the dirty wheels, and by my improved method the perch may be made to approach the axle, leaving no gap between them. The plate E is provided with perforated lugs C', preferably made integral therewith, each of said perforations being screw-threaded, in which is adapted to fit the set-screw O, the upper end of which is adapted to enter or impinge against the chuck S, which latter fits against the under side of the plate F, the bearing side of said chuck being constructed in conformity with the shape of the said plate F. By simply turning the set-screw O in the proper direction the two arcs may be made to approach each other when the plates become worn and rattle.

My invention is simple in construction, is of comparatively few parts, is neat in appearance, durable and efficient in use, and can be manufactured at a small initial cost.

It is evident that many slight changes in the construction and relative arrangement of the different parts might be resorted to without departing from the spirit of my invention; and hence I would have it understood that I do not limit myself to the exact construction shown and described, but consider myself at liberty to make such slight changes and alterations as fairly fall within the spirit and scope of my invention.

Having fully described my invention, what I claim as new, and desire to secure by Letters Patent, is—

The combination, with the bar F, secured to the cross-bar or bolster, said bar provided on its top and inner side with a double trackway, T, of the plate E, secured to the axle and provided with bearing-faces on its periphery, that fit the double trackway T, and the plate K, secured to the axle and pivoted to the perch, substantially as set forth.

In testimony whereof I have signed this specification in the presence of two subscribing witnesses.

WILLIAM H. STICKLE.

Witnesses:
ISAAC CANTRELL,
D. B. ARNOLD.